United States Patent [19]

Grossman et al.

[11] Patent Number: 4,467,083

[45] Date of Patent: Aug. 21, 1984

[54] COPOLYAMIDE-IMIDES

[75] Inventors: Steven J. Grossman, Cheshire; Kemal Onder, North Haven, both of Conn.

[73] Assignee: The Upjohn Company, Kalamazoo, Mich.

[21] Appl. No.: 538,457

[22] Filed: Oct. 3, 1983

[51] Int. Cl.³ .............................................. C08G 18/34
[52] U.S. Cl. ........................................ 528/49; 528/44; 528/67; 528/73
[58] Field of Search ................................. 528/44–49, 528/67, 73

[56] References Cited

U.S. PATENT DOCUMENTS

| | | | |
|---|---|---|---|
| 3,300,420 | 1/1967 | Frey | 260/2.5 |
| 3,803,100 | 4/1974 | Izumi et al. | 260/78 TF |
| 3,817,926 | 6/1974 | Pauze et al. | 260/65 |
| 3,884,880 | 5/1975 | Disque et al. | 260/77.5 AM |
| 3,929,691 | 12/1975 | Allard | 260/30.2 |
| 3,937,673 | 2/1976 | Koerner et al. | 260/18 TN |
| 4,115,372 | 9/1978 | Onder | 528/73 |

Primary Examiner—Maurice J. Welsh
Attorney, Agent, or Firm—Denis A. Firth; Robert A. Armitage

[57] ABSTRACT

Copolyamide-imides characterized by thermoplasticity, high heat resistance and high impact resistance are derived by the reaction of 4,4'-methylenebis(phenyl isocyanate), optionally in admixture with a minor amount (up to 10 mole percent) of toluene diisocyanate (2,4-, 2,6-isomers and mixtures), with a mixture of trimellitic acid or anhydride (30–40 mole percent), isophthalic acid (26–44 mole percent) and a $C_{7-10}$ aliphatic dicarboxylic acid (balance of 100 mole percent but not greater than 32 mole percent). These polymers are useful as engineering plastics.

7 Claims, No Drawings

COPOLYAMIDE-IMIDES

BACKGROUND OF THE INVENTION

1. Field of the Invention

This invention relates to polyamide-imides and is particularly concerned with mixed aromatic-aliphatic copolyamide-imides.

2. Description of the Prior Art

Copolyamide-imides which contain the residues from trimellitic anhydride and aliphatic dicarboxylic acids in the polymer chains along with an arylene radical are well known in the art. U.S. Pat. No. 3,300,420 discloses organic solvent insoluble polyamide-imide reaction products from trimellitic anhydride and aryl polyisocyanates including products wherein up to about 50 mole percent of the trimellitic anhydride may be replaced by an aromatic or aliphatic dicarboxylic acid. Such products are not melt processable. U.S. Pat. No. 3,803,100 describes polyamide-imides derived from trimellitic anhydride and arylene diisocyanates that are solvent soluble but infusible and up to 60 mole percent of the trimellitic anhydride may be replaced by an aromatic dicarboxylic acid. U.S. Pat. No. 3,817,926 describes organic solvent soluble polyamide-imides in which the trimellitic anhydride constituent may be replaced by up to 75 mole percent of a dicarboxylic acid, inclusive of aliphatic dicarboxylic acids, and this mixture reacted with an organic diamine first, followed by a diisocyanate. The polymer obtained thereby is characterized by a low inherent viscosity, that is to say, low molecular weight which does not give rise to a polymer having good physical properties. Similarly, U.S. Pat. No. 3,884,880 discloses trimellitic anhydride-aromatic diisocyanate based copolyamide-imides in which up to 50 mole percent of the anhydride is replaced by an aliphatic dicarboxylic acid wherein the resulting soluble polymers are of low inherent viscosity. U.S. Pat. No. 3,929,691 discloses mixed copolyamide-imides containing the trimellitimide-amide and aromatic amide residues which are solvent soluble and spinnable but which are not melt processable.

U.S. Pat. No. 3,937,673 describes the preparation of solutions of polyamide-imide resins by reaction of trimellitic anhydride, an aromatic diisocyanate and an aliphatic dicarboxylic acid having more than 6 carbon atoms. U.S. Pat. No. 4,115,372 describes injection moldable copolyamide-imides derived by reaction of an aromatic diisocyanate with trimellitic anhydride and an aliphatic dicarboxylic acid having 7 to 12 carbon atoms in the chain separating the carboxylic acid groups. The proportions of the anhydride and the dicarboxylic acid are such that the recurring units derived from the latter comprise 30 to 70 percent of the total recurring units. These copolyamide-imides are characterized by relatively high heat resistance [Heat deflection temperature (HDT) at 264 psi, as measured by ASTM-D648, of the order of 150° C.] as well as by high impact strength and good melt processability.

We have now found that polyamide-imides, having improved properties compared with those of the above '372 patent, can be prepared from trimellitic acid, an aromatic dicarboxylic acid, an aliphatic dicarboxylic acid and an aromatic diisocyanate as will be described more fully hereafter.

SUMMARY OF THE INVENTION

This invention comprises thermoplastic copolyamide-imides characterized by a molecular weight represented by an inherent viscosity (as a 0.5 percent weight by weight solution in dimethylformamide) of 0.5 to 0.9 dL/g. and a heat deflection temperature of at least 170° C. and further characterized in that, of the total recurring units in the molecule, from 30 to 40 percent correspond to the formula:

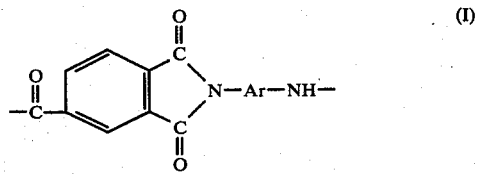

from 26 to 44 percent correspond to the formula

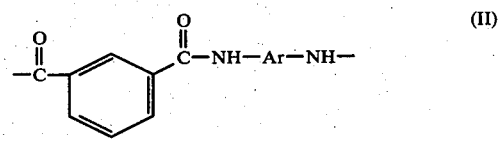

and the remainder, but not more than 32 percent, correspond to the formula

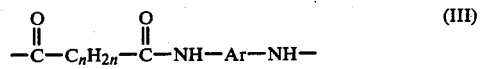

wherein Ar in all instances represents a divalent aromatic moiety of which from 0 to 10 mole percent in any instance is selected from the group consisting of tolylene-2,4, tolylene-2,6, and mixtures thereof, and from 90 to 100 mole percent are of the formula

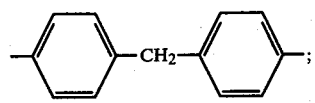

and wherein $C_nH_{2n}$ represents alkylene having from 7 to 10 carbon atoms.

The invention also comprises a process for the preparation of the above described copolyamide-imides.

The term "alkylene having from 7 to 10 carbon atoms" means a divalent saturated, straight or branched chain aliphatic hydrocarbon radical containing the stated number of carbon atoms. Illustrative of such alkylene groups are heptylene, octylene, nonylene, decylene and isomeric forms thereof.

DETAILED DESCRIPTION OF THE INVENTION

The copolyamide-imides of the invention can be prepared by methods which are broadly known in the art, subject to the inclusion of means for controlling molecular weight of the end-product which means will be discussed in more detail below.

Preferably the copolyamide-imides are prepared by reacting the appropriate diisocyanate, namely 4,4'-methylenebis(phenyl isocyanate), optionally admixed with the appropriate proportion of 2,4- and or 2,6-toluene diisocyanate, with trimellitic anhydride, isophthalic acid and the aliphatic dicarboxylic acid, the latter components being employed in proportions corresponding to the particular proportion of recurring units (I), (II) and (III) desired in the end-product.

The overall proportion of isocyanate groups to total equivalents of carboxylic acid and anhydride groups is substantially 1:1. When toluene diisocyanate is included in the polyisocyanate component of the reactants, it is employed advantageously in a proportion of the order of about 1 moles to 10 moles per 100 moles of the methylenebis(phenyl isocyanate) and preferably of the order of 5 moles to 8 moles per 100 moles of the other diisocyanate. The diisocyanate component can also contain minor amounts (i.e. up to about 5 moles percent) of 2,4'-methylenebis(phenyl isocyanate).

The reaction conditions are advantageously those described in the aforesaid U.S. Pat. No. 4,115,372. Thus, the mixture of carboxylic acids and anhydride are dissolved in a dipolar aprotic solvent such as dimethylsulfoxide, diethylsulfoxide, dimethylformamide, diethylformamide, dimethylacetamide, tetramethylurea, hexamethylphosphoramide, N-methylpyrrolidone, tetramethylsulfone, dimethylsulfone, and the like. The resulting solution is then treated, at a temperature in the range of about 100° C. to about 225° C., with the diisocyanate which, advantageously, is also dissolved in the same or like solvent. Preferably the diisocyanate solution is added slowly to the carboxylic acid reactants with good agitation to ensure adequate mixing of the reactants. The progress of the reaction can be followed by routine analytical procedures such as infrared spectroscopy. The required copolyamide-imide can be isolated from the reaction product by routine procedures such as precipitation by addition of a non-solvent of which water, acetone, methyl ethyl ketone, methanol, isopropanol, and ethanol are typical.

Preferably the reaction is carried out in the presence of a catalyst for the reaction of carboxylic acids or carboxylic anhydrides and isocyanates. Illustrative of such catalysts are the N-alkali metal lactamates such as potassium propiolactamate, potassium pyrrolidone, sodium caprolactamate and the like; alkali metal alkoxides such as sodium methoxide, sodium ethoxide, sodium phenoxide and the like; and phospholene-1-oxides such as 1,3-dimethyl-2-phospholene-1-oxide, 1,3-dimethyl-3-phospholene-1-oxides and mixtures thereof and other such heterocyclic phosphorus-containing catalysts disclosed in U.S. Pat. No. 4,156,065 as useful in the above condensation.

In order to control the molecular weight of the copolyamide-imide prepared in the above manner it is necessary to include in the reaction mixture a chain stopper such as a monocarboxylic acid such as benzoic acid, toluic acid, hexanoic acid, nonanoic acid, octadecanoic acid and the like, an intramolecular anhydride of an aromatic 1,2-dicarboxylic acid such as phthalic anhydride, diphenyl-3,4-dicarboxylic acid anhydride, naphthalene-2,3-dicarboxylic acid anhydride, and the like. The proportion in which the chain stopper is used in order to achieve a given molecular weight can be readily determined by a process of trial and error. In general, the amount of chain stopper employed is of the order of about 1 to about 2 mole percent based on total moles of carboxylic acid reactants employed in the reaction mixture.

In a less preferred method of preparation of the copolyamide-imides of the invention the trimellitic anhydride, isophthalic acid and the aliphatic dicarboxylic acid are employed in the form of their acid halides and are reacted in solution in solvents, such as those hereinbefore described, with the appropriate diamine, namely 4,4'-methylenebis(aniline), optionally in admixture with the appropriate proportion of 2,4-toluenediamine, 2,6-toluenediamine and mixtures thereof. The overall proportions of amine groups to total of acid halide and anhydride groups is substantially 1:1. The reaction conditions employed can be those well-known in the art; illustrative of the latter are the conditions set forth in U.S. Pat. No. 3,640,670. When using this less preferred route to the copolyamide-imides of the invention it is necessary to employ the chain terminators discussed above except that the monocarboxylic acid chain terminators are employed in the form of their acid halides. The proportions of chain terminator employed fall within the range set forth above for the more preferred isocyanate route. The precise proportion to use in any given instance can be determined by a process of trial and error.

Exemplary of the aliphatic dicarboxylic acids which can be employed (as the free acids in the preferred process and as the di-acid halides in the less preferred process described above) are azelaic acid, trimethyladipic acid, sebacic acid, undecandioic acid, dodecandioic acid and the like.

As indicated hereinbefore the range of molecular weight which is found desirable in order that the copolyamide-imides of the invention exhibit the desired physical properties is that which is represented by an intrinsic viscosity, as measured on a 0.5 percent w/w solution of the polymer in dimethylformamide, of 0.5 to 0.9 dL/g. This corresponds to a range of weight average molecular weight of about 72,000 to about 130,000 as measured by gel permeation chromatography. If the average molecular weight is reduced below the above range, the structural strength properties of the polymer show significant lowering. If the average molecular weight is allowed to become higher than the upper limit of the above range, the melt processable characteristics of the polymer are deleteriously affected.

Similarly, any significant departure from the proportions of reactants which give recurring units (I), (II) and (III) in the proportions set forth above causes a significant and undesirable change in the structural strength and heat resistant properties of the copolyamide-imides of the invention as will become apparent from the data set forth in the Examples below.

The copolyamide-imides of the invention possess highly valuable resistance to deformation by heat, as measured by their HDT's at 264 psi which are in excess of 170° C. These latter values are significantly greater than those exhibited by corresponding copolyamide-imides prepared from aromatic diisocyanates and a combination of trimellitic anhydride and aliphatic dicarboxylic acids alone, i.e. in the absence of an aromatic dicarboxylic acid, as described in the aforesaid U.S. Pat. No. 4,115,372. The copolyamide-imides of the invention also possess outstanding impact resistance as measured, for example, by the Notched Izod impact test (ASTM-D256-56), excellent tensile strength and tensile modulus in addition to their ease of process by extrusion, injection molding and the like.

A particularly preferred group of copolyamide-imides of the invention are those in which the approximate proportions of recurring units (I), (II), and (III) are 30, 44 and 24 percent respectively.

These various properties discussed above render the copolyamide-imide resins of the invention useful as engineering thermoplastics which can be employed in the fabrication of a wide variety of articles such as automobile body parts, equipment housings, mechanical goods, gears, gaskets, and a wide variety of other such articles which are to be employed under conditions which require high structural strength and resistance to deformation by heat.

Additives conventionally employed in the art can be introduced into the copolyamide-imides of the invention either prior to or during molding of the same. Such additives include antioxidants, dyes, pigments, reinforcing agents and the like.

The following examples describe the manner and process of making and using the invention and set forth the best mode contemplated by the inventors of carrying out the invention but are not to be construed as limiting.

EXAMPLE 1

A copolyamide-imide in which the proportions of the recurring units shown as formulae (I), (II) and (III) above are approximately 30 mole percent, 44 mole percent and 24 mole percent, respectively, was prepared as follows:

A mixture of 174.72 g. (1.82 equiv.) of trimellitic anhydride, 219.95 g. (2.65 equiv.) of isophthalic acid, 138.32 g. (1.45 equiv.) of azelaic acid and 11.96 g. (0.098 equiv.) of benzoic acid was charged to a dried reactor and maintained under an atmosphere of nitrogen. A total of 3500 ml. of tetramethylenesulfone (previously distilled and having a water content of less than 125 ppm) was also charged to the reactor. The resulting mixture was heated to 220° C. under reflux with mechanical agitation. When all the solids had dissolved, 2.2 g. of a mixture of 1,3-dimethyl-2- and 1,3-dimethyl-3-phospholene-1-oxide was added followed by the dropwise addition, over a period of 20 minutes, of 38.7 g. (0.45 equiv.) of 2,4-toluene diisocyanate. Evolution of carbon dioxide began very rapidly after the first addition of the diisocyanate. When the addition of this diisocyanate had been completed the mixture was stirred for a period of 30 minutes during which the temperature was maintained at 220° C. At the end of this time the dropwise addition was commenced of a solution of 698.1 g. (5.58 equiv.) of 4,4'-methylenebis(phenyl isocyanate) in 700 ml. of tetramethylenesulfone (same batch as used in the initial reaction mixture). The mechanical agitation was continued during the addition. When approximately 90 percent of the diisocyanate solution had been added (approx. 90 minutes) the remainder of the solution was diluted with a further 300 ml. of tetramethylenesulfone and the rate of addition was adjusted so that the addition of this final portion of diisocyanate required approximately 90 minutes. The resulting mixture was maintained at 220° C. with stirring overnight. At the end of this time the reaction solution was poured slowly into a large batch of water. The resulting solid polymer was chopped into small pieces and washed with successive batches of water until the content of tetramethylenesulfone in the polymer was found to be less than 1 percent by weight as determined by thermogravimetric analysis. The resulting copolyamide-imide was then dried at 110° C. for 24 hr. The inherent viscosity of the dried material (0.5 percent w/w in dimethylformamide) was found to be 0.76 dL/g.

A sample of the copolyamide-imide so prepared was then extruded in the form of a strand using a Brabender extruder with ⅛" diameter die. The barrel temperatures were 290°, 295°, 295° and 295° C. and the screw speed was 30 rpm. The extruded strand was chopped into pellets and the pelletized material was utilized to prepare test bars (for determination of tensile and flexural strength properties) by injection molding using an Arburg machine. The feed zone temperature was 310° C., center zone 315° C. and the nozzle 315° C. Mold temperature was 175° C. and the injection pressure was 18,000–18,600 psi. The following physical properties were determined using the resulting test bars.

| [1]Tensile strength | psi | 13,640 |
| [1]Tensile at yield | psi | 14,870 |
| [1]Tensile modulus | psi | 316,000 |
| [1]Elongation at break | % | 8–17 |
| Yield | % | 10 |
| [2]Notched Izod Impact ⅛" | ft. lbs./in. | 3.16 |
| [3]HDT at 264 psi | °C. | 174 |

[1]: ASTM D638-68
[2]: ASTM D256-56
[3]: ASTM D648

EXAMPLE 2

Using exactly the procedure described in Example 1, but adjusting the proportions of the reactants to the amounts listed below, there was prepared a copolyamide-imide in which the proportions of the recurring units shown as formulae (I), (II) and (III) above were approximately 40 mole percent, 34 mole percent and 24 mole percent, respectively.

The amounts and proportions of ingredients used were as follows:

4,4'-methylenebis(phenyl isocyanate): 978.3 g.: 7.82 equiv.
2,4-toluenediisocyanate: 53.3 g.: 0.62 equiv.
trimellitic anhydride: 244.5 g.: 3.40 equiv.
isophthalic acid: 438.4 g.: 2.87 equiv.
azelaic acid: 137.6 g.: 2.06 equiv.
benzoic acid: 14.4 g.: 0.118 equiv.

The copolyamide-imide was found to have an intrinsic viscosity (0.5 percent w/w in dimethylformamide) of 0.63 dL/g.

Using the procedures described in Example 1 the copolyamide-imide so prepared was extruded and the extruded material was pelletized and injection molded to give test bars for physical testing purposes. The following physical properties were determined on the test samples so obtained.

| Tensile strength | psi | 15,000 |
| Tensile modulus | psi | 327,000 |
| Elongation at break | % | 7 |
| Notched Izod Impact ⅛" | ft. lbs./in. | 2.92 |
| HDT at 264 psi | °C. | 179 |

EXAMPLE 3 (COMPARISON EXAMPLE)

This Example demonstrates the importance of controlling the molecular weight as measured by the intrinsic viscosity (0.5 percent w/w in dimethylformamide) within the range of 0.5–0.9 dL/g. The preparation of the copolyamide-imide described in Example 1 was repeated exactly as set forth except that the amount of benzoic acid was reduced to 10.25 g. (0.084 equiv.). The resulting copolyamide-imide had an intrinsic viscosity (0.5 percent w/w in dimethylformamide) of 1.10 dL/g.

It was found that, although the polymer so prepared could be extruded as pellets, it had insufficient thermal stability to permit the injection molding of test bars for physical testing purposes. All attempts to carry out such injection molding failed because of the inability of the polymer to withstand the temperatures required for such molding.

EXAMPLE 4 (COMPARISON EXAMPLE)

This Example shows the effect of increasing the proportion of the recurring unit (III) derived from the aliphatic dicarboxylic acid to a level above 32 percent, namely a level of 34 percent. It will be seen from the results quoted below that the HDT value determined for the copolyamide-imide in question was significantly lower than those of copolyamide-imides of the invention described in Examples 1 and 2 above.

The copolyamide-imide of this Example was prepared exactly as described in Example 1 except that the following amounts and proportions of reactants were employed:

|  | Amount (g.) | Equivs. |
|---|---|---|
| 4,4'-methylenebis(phenyl isocyanate) | 698.1 | 5.58 |
| 2,4-toluenediisocyanate | 38.7 | 0.45 |
| trimellitic anhydride | 233.28 | 2.43 |
| isophthalic acid | 119.52 | 1.44 |
| azelaic acid | 197.46 | 2.07 |
| benzoic acid | 10.25 | 0.084 |

The copolyamide-imide so prepared was found to have an intrinsic viscosity (0.5 percent w/w in dimethylformamide) of 0.9 dL/g. Using the procedures described in Example 1 the copolyamide-imide was extruded and the extruded material was pelletized and injection molded to give test bars for physical testing purposes. The following physical properties were determined on the test samples so obtained.

| Tensile strength | psi | 13,360 |
|---|---|---|
| Tensile modulus | psi | 327,000 |
| Elongation at break | % | 13 |
| Notched Izod Impact ⅛" | ft. lb./in. | 2.31 |
| HDT at 264 psi | °C. | 167 |

EXAMPLE 5

Using exactly the procedure and reactant proportions employed in Example 1, with the sole exception that the benzoic acid proportion was reduced to 10.25 g. (0.084 equivs.), there was obtained a copolyamide-imide of the invention having an intrinsic viscosity (0.5 percent w/w in dimethylformamide) of 0.84 dL/g. This polymer was pelletized by extrusion and the pellets were injection molded to produce test bars using the procedures described in Example 1. The following physical properties were determined using the resulting test bars.

| Tensile strength | psi | 8290 |
|---|---|---|
| Tensile modulus | psi | 334,516 |
| Elongation at break | % | 2.9 |
| Notched Izod Impact ⅛" | ft. lb/in. | 1.67 |

-continued

| HDT at 264 psi | °C. | 173 |
|---|---|---|

We claim:

1. A thermoplastic copolyamide-imide characterized by a molecular weight represented by an inherent viscosity (as a 0.5 percent weight by weight solution in dimethylformamide) of 0.5 to 0.9 dL/g. and a heat deflection temperature of at least 170° C. and further characterized in that, of the total recurring units in the molecule, from 30 to 40 percent correspond to the formula

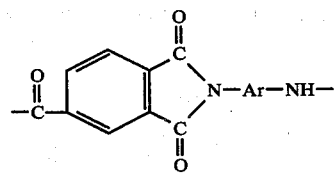

from 26 to 44 percent correspond to the formula

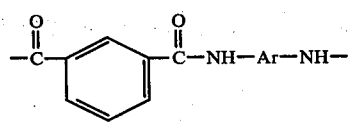

and the remainder, but not more than 32 percent, correspond to the formula

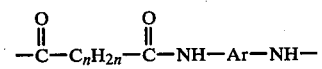

wherein Ar in all instances represents a divalent aromatic moiety of which from 0 to 10 percent in any instance are selected from the group consisting of tolylene-2,4, tolylene-2,6 and mixtures thereof and from 90 to 100 percent are of the formula

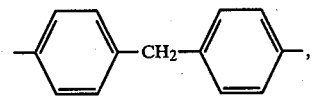

and wherein $C_nH_{2n}$ represents alkylene having from 7 to 10 carbon atoms.

2. A copolyamide-imide according to claim 1 wherein the proportion of units of formula (I) is approximately 30 percent, the proportion of units of formula (II) is approximately 44 percent and the remainder are units of formula (III).

3. A copolyamide-imide according to claim 2 wherein from 92 to 95 percent of the Ar moieties have the formula

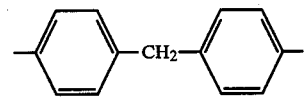

the remainder of said Ar moieties being selected from tolylene-2,4, tolylene-2,6 and mixtures thereof.

4. A copolyamide-imide according to claim 1 wherein —$C_nH_{2n}$— in formula (III) represents —$(CH_2)_7$—.

5. A copolyamide-imide according to claim 2 wherein —$C_nH_{2n}$— in formula (III) represents —$(CH_2)_7$—.

6. A thermoplastic copolyamide-imide characterized by a molecular weight represented by an inherent viscosity (as a 0.5 percent w/w solution in dimethylformamide) of 0.5 to 0.9 dL/g. and a heat deflection temperature of at least 170° C. and further characterized in that, of the total recurring units in the molecule, approximately 30 percent correspond to the formula:

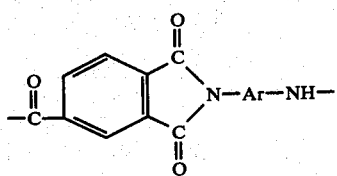

approximately 44 percent correspond to the formula:

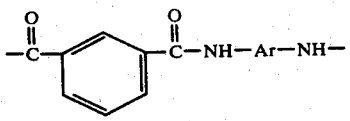

and approximately 24 percent correspond to the formula:

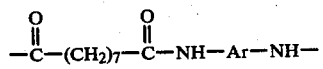

wherein Ar is the residue of an aromatic diisocyanate from 90 to 100 percent of the latter residues being derived from 4,4'-methylenebis(phenyl isocyanate) and the remaining 0 to 10 percent being derived from 2,4-toluenediisocyanate, 2,6-toluenediisocyanate and mixtures thereof.

7. A thermoplastic copolyamide-imide according to claim 6 wherein Ar is the residue of an aromatic diisocyanate, 92.5 percent of which residues are derived from 4,4'-methylenebis(phenyl isocyanate) and the remainder are derived from 2,4-toluenediisocyanate.

* * * * *